Nov. 13, 1945.  N. BREWER  2,388,671
FLOW RESPONSIVE SWITCH
Filed May 26, 1943
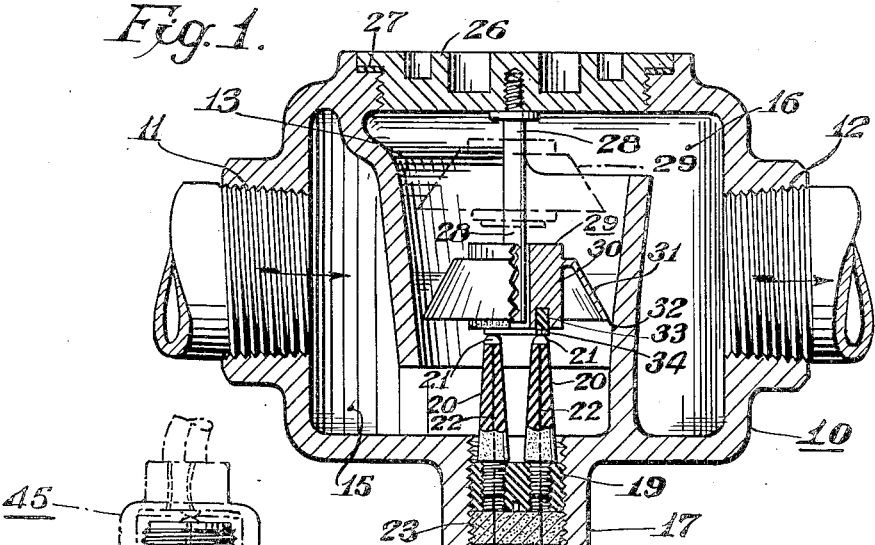
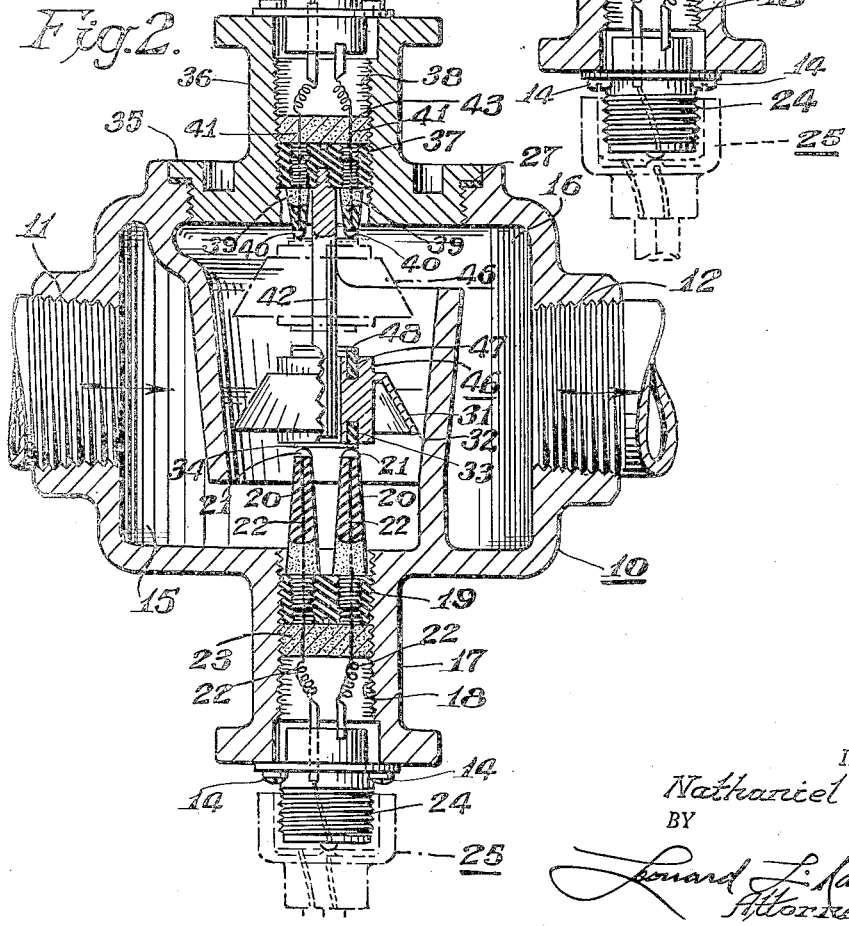
INVENTOR.
Nathaniel Brewer
BY
Leonard L. Kalish
Attorney Patented Nov. 13, 1945

2,388,671

UNITED STATES PATENT OFFICE 2,388,671

FLOW RESPONSIVE SWITCH

Nathaniel Brewer, Hatfield, Pa., assignor to Fischer & Porter Company, Hatboro, Pa., a corporation of Pennsylvania Application May 26, 1943, Serial No. 488,527

6 Claims. (Cl. 200—81)

The present invention relates to signaling devices for indicating insufficient and/or excessive rates-of-flow of fluid and it relates more particularly to a certain new and useful device for automatically transmitting a signal when the rate-of-flow of fluid within a conduit falls below a predetermined minimum and/or when the rate-of-flow of fluid exceeds a predetermined maximum.

An object of the present invention is to provide a simple, inexpensive and dependable device for automatically transmitting a warning signal when the rate-of-flow of a fluid within a conduit or the like drops below a predetermined minimum safety point and/or when the rate-of-flow exceeds a predetermined maximum safety point.

Other objects and advantages of the present invention are apparent in the following detailed description, appended claims and accompanying drawing.

Circulating fluid systems are commonly employed in many different types of present-day actuating mechanisms.

For example, the retractible landing gear and the bomb-bay doors of a modern bomber are actuated by fluid continuously circulating in a closed system—the fluid being valved to the actuating mechanism when it is desired to lower or raise the landing gear or to open or shut the bomb-bay doors. The actuating mechanism requires a minimum flow-rate of fluid in order to function. It becomes extremely important, therefore, to determine whether or not the flow-rate is above the minimum or danger point especially when attempting to lower the landing gear for a landing or to open the bomb-bay doors preliminary to dropping bombs, since, otherwise, the landing gear would not be lowered and the bomb-bay doors would not be opened—either failure resulting disastrously to the aircraft.

Accordingly, my present invention is directed, in part, to the use of a certain new and useful signalling device which, when inserted within such circulating fluid line, will instantaneously and dependably transmit an automatic warning signal whenever the rate-of-flow within the fluid line drops below a predetermined minimum.

My present invention is also directed to a device for automatically signalling excessive rates-of-flow in the above and other types of fluid lines.

For the purpose of illustrating the invention there are shown in the accompanying drawing forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawing in which like reference characters indicate like parts throughout:

Figure 1 represents a cross-sectional view of one embodiment of the present invention.

Figure 2 represents a cross-sectional view similar to that of Figure 1 but showing a modified form of the present invention.

In the embodiment of Figure 1, I may provide a body or housing 10 of any suitable material (as for example cast aluminum), having an inlet opening 11 and an outlet opening 12—the openings 11 and 12 being preferably disposed on opposite sides of the housing 10.

The housing 10 is provided with a central vertically-extending downwardly tapered frusto-conical portion 13—a conduit 15 extending from the inlet opening 11 to the lower end of the conical portion 13, and a conduit 16 extending from the upper end of the conical portion 13 to the outlet opening 12.

An apertured internally screw-threaded neck or boss 17 is formed on the under side of the housing 10—the opening 18 in said boss 17 being generally in line with the conical portion 13.

An externally screw-threaded nut 19 is adapted to be adjustably positioned within the screw-threaded opening 18 of the boss 17.

A pair of spaced contact posts 20 are screw-threadedly mounted upon the nut 19 and extend generally upwardly therefrom. The nut 19 and the contact posts 20 may be constructed of Bakelite or other similar material which is a non-conductor of electricity.

Electrical contacts 21 (which may be of silver or other suitable material which is a good conductor of electricity and which is relatively resistant to corrosion) are mounted at the upper ends of the contact posts 20. Wires 22 extend downwardly from the contacts 21 through the contact posts 20 and the nut 19.

The nut 19 is adapted to be adjusted within the screw-threaded opening 18 of the boss 17 until the upper ends of the contact posts 20 extend a short distance within the lower end of the conical portion 13 of the housing 10.

After the nut 19 has been so adjusted, a layer of sealing wax 23 is permitted to harden underneath the nut 19 to form a fluid-tight seal between the nut 19 and the opening 18 in the boss 17.

The wires 22 extend through the sealing wax layer 23 and are connected to an electrical contact plug 24 which is fastened within the lowermost slightly enlarged end of the opening 18 by a plurality of mounting screws or bolts 14 and which has a downwardly-extending externally screw-threaded portion which is adapted to be connected to an internally screw-threaded electric socket 25.

A cover 26 is adapted to be screw-threadedly attached to the upper side of the housing 10; an intermediate gasket 27 being provided to give a fluid-tight seal between said cover 26 and said body 10.

A guide rod 28 is screw-threadedly affixed to the under side of the cover 26 and extends downwardly therefrom generally along the axis of the conical portion 13 of said body 10; the lower end of the guide rod 28 terminating slightly above the upper ends of the contact posts 20.

A "float" or sinker 29 is mounted upon said guide rod 28 and is adapted for free up-and-down movement therealong within said conical portion 13.

The float 29 (which may be of brass or other suitable material having a specific gravity greater than the specific gravity of the fluid with which the device is to be used) includes a generally cylindrical body portion 30 and an annular flow-constricting umbrella-like conical head portion 31 extending downwardly and outwardly from the upper part of said body portion 30.

The periphery 32 of said portion 31 is slightly smaller in radial dimension than the lower end of the conical portion 13; the annular clearance between the periphery 32 and the conical portion 13 being very slight when the float 29 is in its lowermost position within said conical portion 13 and gradually increasing as the float 29 rises within the conical portion 13.

It will be apparent that, when fluid flows from the inlet opening 11 through the conduit 15 and upwardly through the conical portion 13 of said body 10 (to leave through the conduit 16 and the outlet opening 12), the pressure of the fluid on the under side of the float 29 will tend to lift it from its lowermost position (shown in solid lines in Figure 1) to an elevated position (shown in dotted lines in Figure 1). On the other hand, when there is no flow of fluid through the body 10, the float 29 will remain in its lowermost position since it has a higher specific gravity than the fluid; the float 29 remaining in its lowermost position until the upward pressure of the moving fluid overcomes the negative buoyancy of the float within the fluid. It follows, therefore, that the float 29 will not be lifted upwardly within the conical portion 13 until there is a predetermined minimum rate-of-flow sufficient to give a lift adequate to overcome the negative buoyancy of the float within the fluid.

It is apparent, also, that the height of the float 29 within the conical portion 13 will be dependent upon the rate-of-flow. That is, at relatively low rates-of-flow, the float 29 will be lifted only slightly within the conical portion 13 so that the annular clearance between the periphery 32 of said float and the conical portion 13 is relatively slight. When the rate-of-flow increases, the float 29 will be moved to correspondingly higher positions within the conical portion 13 to give correspondingly larger annular clearances between the periphery 32 and the conical portion 13.

It will be apparent that the float 29 will remain at some elevated position within the conical portion 13 as long as the rate-of-flow exceeds a predetermined minimum value. Should the flow cease or should the rate-of-flow drop below the predetermined minimum value required to counteract the negative buoyancy of the float within the fluid, the float will sink to its lowermost position within the conical portion 13.

An annular ring 33 of Bakelite or other insulating material is mounted within the lower end of the body portion 30 of the float 29 and protrudes slightly downwardly therefrom. A contact ring 34 of silver or the like is disposed upon the lowermost protruding end of the Bakelite ring 33. The ring 33 has a diameter corresponding generally to the distance between the contacts 21 so that, when the float 29 is in its lowermost position within the conical portion 13, the contact ring 39 rests upon the contacts 21 to close the electrical circuit. On the other hand, whenever the rate-of-flow exceeds the predetermined minimum value, the float 29 is lifted upwardly within the conical portion 13 to move the contact ring 34 away from the contacts 21 and thus to break the electrical circuit.

The fluids used in hydraulic systems of the character described are invariably fluids such as petroleum oils which are non-electrolytes or very poor conductors of electricity so that, when the float is at an elevated position, there will be no flow of current between the contacts 21 through the fluid itself.

As can be seen from Figure 1, the non-conducting contact posts 20 extend upwardly an appreciable distance beyond the bottom of the housing 10 so that, should small amounts of water or sludge or other impurity (which might perhaps act as an electrical conductor) tend to settle out from the oil, they will accumulate below the contacts 21 and will not cause short circuiting.

As stated above, the plug 24 is adapted detachably to receive an electric socket 25 from which wires extend to the battery or generator of the plane and also to any conventional type of indicating device on the instrument panel. The indicating device may, for example, include a conventional electro-magnetically operated indicating pointer or needle (not shown) which will move when the rate-of-flow of fluid drops below the predetermined minimum to cause the contact ring 34 to touch the contacts 21 and thus to close the electrical circuit between the battery and the indicating device and to actuate the needle or pointer. On the other hand, the indicating device on the instrument panel may be simply an electric light bulb (not shown) which will flash on when the rate-of-flow drops below the danger point (to permit the float 29 to drop and to close the electrical circuit between the battery or generator and the indicating bulb). The indicating device may also be a conventional audible signal, such as a buzzer or bell (not shown) which may be used in place of, or in addition to, the other indicating devices described hereinabove.

It will be apparent from the above description that, so long as the rate-of-flow of the fluid within the hydraulic system is above the predetermined minimum required to actuate the different mechanisms, there will be no visible or audible signal and, therefore, the operator will know that his actuating mechanisms will function properly when required. On the other hand, should the rate-of-flow fall below the predetermined minimum value (which may be the result of a leak in the hydraulic line or the result of a failure of the fluid pumping mechanism), the indicating device will give an immediate and automatic signal so that the operator will know that he cannot rely upon his hydraulic actuating mechanism and must either repair the mechanism or rely upon some alternative manual operating mechanism instead.

In Figure 2 there is shown a modified form of the present invention which will indicate excessive rate-of-flow as well as insufficient rate-of-flow. The embodiment of Figure 2 includes a housing 10 which, with its associated parts, is identical with the embodiment of Figure 1—the only differences residing in the float and the cover as will be hereinafter discussed.

Instead of the cover 26 of Figure 1, the embodiment of Figure 2 includes a cover 35 which is adapted to be screw-threadedly inserted within the top of the housing 10. The cover 35 includes an upwardly-extending apertured internally screw-threaded boss 36 generally similar to the boss 17 on the under side of the housing 10.

An externally screw-threaded nut 37 is adapted to be adjustably positioned within the internally screw-threaded opening 38 in said boss 36.

A pair of spaced, relatively short downwardly-extending Bakelite contact posts 39 are screw-threadedly mounted upon the nut 37 and carry electrical contacts 40 at their lower ends; wires 41 leading from the contacts 40 and extending through the contact posts 39 and the nut 37.

A central downwardly-extending guide rod 42 is screw-threadedly mounted upon the nut 37.

The contact ring 34 is adapted to be adjusted within the opening 38 of the boss 36 so that, as shown in Figure 2, the guide rod 42 extends downwardly just short of the lower contacts 21 and so that the upper contacts 40 extend downwardly a slight distance below the under side of the cover 35.

After the nut 37 has been so adjusted for the predetermined maximum rate-of-flow, a layer of sealing wax 43 is deposited above the nut 37 to provide a fluid-tight seal.

The wires 41 extend through the layer of sealing wax 43 and are connected to an uppermost externally screw-threaded electrical plug 44 similar to the plug 24 described hereinabove; the plug 44 being adapted to be detachably connected to an internally screw-threaded electrical socket 45.

A float 46 is mounted upon the guide rod 42 and is adapted for free up-and-down movement thereupon within the conical portion 13 of the housing 10. The float 46 is generally the same as the float 29 of Figure 1 except that it has an additional Bakelite ring 47 set in the upper end of the body portion of the float and extending slightly upwardly therefrom; the Bakelite ring 47 carrying a silver contact ring 48 which is adapted to make electrical contact with the contacts 40 when the float 46 is in its uppermost position within the conical portion 13.

It can be seen that the embodiment of Figure 2 will signal both excessive and insufficient rates-of-flow—the contacts 21 being closed by the contact ring 34 when there is insufficient flow to actuate one signal or indicating device, and the contacts 40 being closed by the contact ring 48 when there is excessive flow to actuate another signal or indicating device.

It is obvious that if it is important only to sig-nal excessive rates-of-flow (that is, if there is no minimum danger point in flow-rate), the lower contacts 21 need not be connected or, indeed, they may be eliminated entirely.

While the present invention has been described hereinabove in connection with one of its common uses (namely for signalling insufficient and/or excessive rates-of-flow of fluid in a hydraulic system for aircraft), this has been by way of illustration only—the present invention being adapted for use in other types of hydraulic systems as well. For instance, the present invention is particularly well adapted for signalling insufficient and/or excessive rate-of-flow of fluid in a circulating cooling system or the like, in which proper control of temperature is dependent upon proper rate-of-flow of the cooling fluid.

While the signalling device of the present invention is primarily intended for use with fluids which are so-called "non-conductors" (as for example mineral and vegetable oils and other organic fluids), it may also be used with other fluids which are somewhat better conductors of electricity (as for example, ordinary city water or well water which contains small amounts of impurities so as to make it a slight conductor of electricity). When used with water or other similar fluids, the contacts are spaced well apart and a low voltage is employed; the low voltage and the relatively high resistance of the fluid permitting very little, if any, flow of current between the contacts when the contact ring of the float does not close the circuit. It can be seen that, if the signalling or indicating device is so constructed as to respond only to a current of a certain minimum amperage, it will not signal or indicate the slight flow of current which takes place when the contact ring does not close the circuit. When, on the other hand, the contact ring does close the circuit, the resistance is greatly reduced and the amperage correspondingly increased to actuate the signal or indicating device.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, what I claim as new and desire to protect by Letters Patent is:

1. A device for signalling insufficient rate-of-flow of fluid comprising an integral cast metal housing having a vertically-extending downwardly-tapered chamber formed integrally therewithin and adapted for upward flow of fluid therethrough, said housing having a screw-threaded neck formed in the bottom thereof, a cover removably fastened within the top of said housing, a nut screw-threadedly mounted within said neck, said nut having a pair of spaced electrical contacts extending upwardly therefrom and into the lower end of said tapered chamber, electrical conductors extending from said contacts through said nut and terminating in quick attachable and detachable electrical connection means on the outside of said housing, and a flow-constricting float adapted for free up-and-down movement within said chamber, said float having an electrical contact ring disposed on the underside thereof, said contact ring being adapted to complete an electrical circuit between said contacts when brought into juxtaposition therewith, said float having a specific gravity somewhat greater than the specific gravity of said fluid, the vertical position of said float within said chamber being generally dependent upon the rate-of-flow of said fluid, whereby an insufficient rate-of-flow will permit said float to sink within said chamber thereby to cause said contact ring to complete the electrical circuit between said contacts.

2. A device for signalling insufficient rate-of-flow of fluid comprising an integral cast metal housing having a vertically-extending downwardly-tapered chamber formed integrally therewithin and adapted for upward flow of fluid therethrough, said housing having a screw-threaded neck formed in the bottom thereof, a cover removably fastened within the top of said housing, a nut screw-threadedly mounted within said neck, said nut having a pair of spaced contact posts extending upwardly therefrom and into the lower end of said tapered chamber, said posts being of non-conducting material and carrying corrosion-resistant electrical contacts at the upper ends thereof, said contacts being disposed generally adjacent the lower end of said chamber, electrical conductors extending from said contacts inside of said posts and through said nut and terminating in quick attachable and detachable electrical connection means on the outside of said housing, and a flow-constricting float adapted for free up-and-down movement within said chamber responsive to variations in rate-of-flow, said float being of non-conducting material and having a corrosion-resistant electrical contact ring disposed on the under-side thereof, said contact ring being adapted to complete an electrical circuit between said contacts when said float reaches its lowermost position within said chamber responsive to insufficient rate-of-flow.

3. A device for signalling insufficient rate-of-flow of fluid comprising an integral cast metal housing having a vertically-extending downwardly-tapered chamber formed integrally therewithin and adapted for upward flow of fluid therethrough, said housing having a screw-threaded neck formed in the bottom thereof, a cover removably fastened within the top of said housing, a nut screw-threadedly mounted within said neck, said nut having a pair of spaced electrical contacts extending upwardly therefrom and into the lower end of said tapered chamber, electrical conductors extending from said contacts through said nut and terminating in quick attachable and detachable electrical connection means on the outside of said housing, and a centrally apertured flow-constricting float adapted for free up-and-down movement within said chamber responsive to variations in rate-of-flow of fluid therethrough, said float having an electrical contact ring disposed on the under-side thereof, said contact ring being adapted to complete an electrical circuit between said contacts when said float assumes its lowermost position within said chamber upon insufficient rate-of-flow, said cover having a rod extending downwardly therefrom and within the aperture of said float whereby said float is guided generally axially along said chamber.

4. A device for signalling excessive rate-of-flow of fluid comprising an integral cast metal housing having a vertically extending downwardly-tapered chamber formed integrally therewithin and adapted for upward flow of fluid therethrough, a cover removably fastened within the top of said housing, said cover having an internally screw-threaded neck formed thereon, a nut screw-threadedly mounted within said neck, said nut having a pair of spaced electrical contacts extending downwardly therefrom and terminating adjacent the upper end of said chamber, electrical conductors extending from said contacts and terminating in quick attachable and detachable electrical connection means on the outside of said housing, and a flow-constricting float adapted for free up-and-down movement within said chamber responsive to variations in rate-of-flow, said float having an electrical contact ring disposed on the upper side thereof, said contact ring being adapted to complete an electrical circuit between said contacts when said float assumes its uppermost position within said chamber responsive to excessive flow-rate.

5. A device for signalling excessive rate-of-flow of fluid comprising an integral cast metal housing having a vertically extending downwardly-tapered chamber formed integrally therewithin and adapted for upward flow of fluid therethrough, a cover removably fastened within the top of said housing said cover having an internally screw-threaded neck formed thereon, a nut screw-threadedly mounted within said neck, said nut having a pair of spaced contact posts extending downwardly therefrom, said posts being of non-conducting material and carrying a pair of corrosion-resistant electrical contacts at the lower ends thereof, said contacts being disposed generally adjacent the upper end of said tapered chamber, quick attachable and detachable electrical connection means mounted at the upper end of said neck, electrical conductors extending from said contacts inside of said posts and said nut and leading to said connection means, a guide-rod extending downwardly from said nut intermediate said posts, said guide-rod extending within the tapered chamber substantially along the axis thereof, and a centrally-apertured metering float slidably mounted upon said guide-rod and adapted for free up-and-down movement within said tapered chamber responsive to variations in rate-of-flow therethrough, said float being of non-conducting material and having a corrosion-resistant electrical contact ring disposed on the upper side thereof, said contact ring being adapted to complete an electrical circuit between said contacts when said float rises to its uppermost position responsive to excessive flow-rate.

6. A device for signalling insufficient and excessive rates-of-flow of fluid comprising an integrally cast metal housing having a vertically-extending downwardly-tapered chamber formed integrally therewithin and adapted for upward flow of fluid therethrough, said housing having an internally screw-threaded neck formed in the bottom thereof, a cover removably fastened within the top of said housing, said cover having an internally screw-threaded neck formed thereon, a nut screw-threadedly mounted within each of said necks, the lower nut having a pair of spaced electrical contacts extending upwardly therefrom and terminating generally adjacent the lower end of said chamber, the upper nut having a pair of spaced electrical contacts extending downwardly therefrom and terminating generally adjacent the upper end of said chamber, one of said nuts having a guide-rod extending therefrom and within said chamber generally along the axis thereof, and a centrally-apertured metering float slidably mounted upon said guide-rod and adapted for free up-and-down movement within said chamber responsive to variations in rate-of-flow, said float having upper and lower electrical contact rings mounted thereon, the upper contact ring being adapted to complete an electrical circuit between the upper contacts when said float rises to its uppermost position due to excessive flow-rate, the lower contact ring being adapted to complete an electrical circuit between the lower contacts when said float sinks to its lowermost position due to insufficient flow-rate.

NATHANIEL BREWER.